United States Patent
Kristen et al.

(10) Patent No.: US 6,683,018 B1
(45) Date of Patent: Jan. 27, 2004

(54) METHOD FOR PRODUCING A SUPPORTED CATALYST SYSTEM

(75) Inventors: Marc Oliver Kristen, Limburgerhof (DE); Laurent Deloux, Heidelberg (DE); Peter Kölle, Bad Dürkeim (DE); Ulrich Moll, St Martin (DE); Ursula Rief, Heddesheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/622,211

(22) PCT Filed: Feb. 5, 1999

(86) PCT No.: PCT/EP99/00784

§ 371 (c)(1),
(2), (4) Date: Aug. 14, 2000

(87) PCT Pub. No.: WO99/42493

PCT Pub. Date: Aug. 26, 1999

(30) Foreign Application Priority Data

Feb. 17, 1998 (DE) .......................... 198 06 435

(51) Int. Cl.⁷ ................................. B01J 31/00
(52) U.S. Cl. .................. 502/150; 502/118; 502/119; 502/120; 502/121; 502/122; 502/123; 502/124; 502/125; 502/126; 502/127; 502/128; 502/129; 502/130; 502/131; 502/132; 502/133; 502/134
(58) Field of Search ................... 502/118–134

(56) References Cited

U.S. PATENT DOCUMENTS

| 6,034,258 | A | * | 3/2000 | Kristen et al. ............... 556/12 |
| 6,180,737 | B1 | * | 1/2001 | Kristen et al. ............... 526/161 |
| 6,265,339 | B1 | * | 7/2001 | Bidell et al. ................ 502/104 |
| 6,326,444 | B2 | | 12/2001 | Lynch et al. |
| 6,348,547 | B1 | * | 2/2002 | Deckers et al. ........... 525/333.8 |
| 6,350,829 | B1 | | 2/2002 | Lynch et al. |
| 6,433,110 | B1 | | 8/2002 | Lynch et al. |

FOREIGN PATENT DOCUMENTS

| DE | 19606165 A1 | * | 8/1997 | ........... C08F/4/646 |
| EP | 694 548 | | 1/1996 | |
| EP | 768 320 | | 4/1997 | |
| WO | 91/09882 | | 7/1991 | |
| WO | 94/03506 | | 2/1994 | |
| WO | 95/07939 | | 3/1995 | |
| WO | 95/14044 | | 5/1995 | |
| WO | 95/15815 | | 6/1995 | |

OTHER PUBLICATIONS

BASF 46597 (Patent Appln.) Ser. No. 09/125,317.
J. Org. Chem. 369 (1989) 359–370.
BASF 46595 (Equivalent to DE 196 06 167).

* cited by examiner

Primary Examiner—Mark L. Bell
Assistant Examiner—Jennine Brown
(74) Attorney, Agent, or Firm—Keil & Weinkauf

(57) ABSTRACT

A process for the preparation of a supported catalyst system, an inorganic carrier material being reacted with a metal compound of the formula $$M^1(R^1)_r(R^2)_s(R^3)_t(R^4)_u \qquad \text{I}$$

in the presence of an inert solvent in a first step and, in a subsequent step, the suspension thus obtained being reacted with a metallocene complex and a compound forming metallocenium ions, in which process the solvent is not removed after the first step and the subsequent step is carried out without isolation of the pretreated carrier material thus obtained.

9 Claims, No Drawings

METHOD FOR PRODUCING A SUPPORTED CATALYST SYSTEM

CROSS-REFERENCE TO RELATED APPLICATION

STATEMENT REGARDING FEDERALLY SPONSORED RESEARCH OR DEVELOPMENT

NOT APPLICABLE

INCORPORATION-BY-PREFERENCE OF MATERIAL SUBMITTED ON A COMPACT DISC (See 37 CFR 152 (e)(5) and MPEP 608.05. Computer program listings (37 CFR 1.96(c)), "Sequence Listings" (37 CFR 1.821(c)), and tables having more than 50 pages of text are permitted to be submitted on compact discs.) or REFERENCE TO A "MICROFICHE APPENDIX" (See MPEP §608.05(a).

NOT APPLICABLE

The present invention relates to a process for the preparation of a supported catalyst system, an organic or inorganic carrier material being reacted in a first step with a metal compound of the formula I

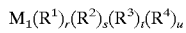

$$M_1(R^1)_r(R^2)_s(R^3)_t(R^4)_u \qquad \text{I}$$

where
- $M^1$ is an alkali metal, an alkaline earth metal or a metal of main group III or IV of the Periodic Table,
- $R^1$ is hydrogen, $C_1$- to $C_{10}$-alkyl, $C_6$- to $C_{15}$-aryl, alkylaryl or arylalkyl, each having 1 to 10 carbon atoms in the alkyl radical and 6 to 20 carbon atoms in the aryl radical,
- $R^2$ to $R^4$ are each hydrogen, halogen, $C_1$- to $C_{10}$-alkyl, $C_6$- to $C_{15}$-aryl, alkylaryl, arylalkyl, alkoxy, aryloxy or dialkylamino, each having 1 to 10 carbon atoms in the alkyl radical and 6 to 20 carbon atoms in the aryl radical,
- r is an integer from 1 to 4 and
- s, t and u are each an integer from 0 to 3, the sum r+s+t+u corresponding to the valency of $M^1$, in the presence of an inert solvent and, in a subsequent step, the suspension thus obtained being reacted with a metallocene complex and a compound forming metallocenium ions.

BACKGROUND OF THE INVENTION (1) Field of the Invention (2) Description of Related Art Including Information Disclosed under 37 CFR and 1.98

Metallocene catalyst systems are becoming more and more important for the polymerization of olefins. Supported catalyst systems are used for this purpose, particularly for polymerization processes in the gas phase. The preparation of various supported catalyst systems has therefore long been known.

If the carrier material used is an inorganic one, such as silica gel, it is generally necessary to modify reactive groups, such as hydroxyl groups, on the surface of the carrier, which are capable of reacting with the central atom of the catalyst complex. Particularly when metallocene catalyst complexes are applied to the carrier, such surface modification is necessary.

Processes for supporting metallocenes on inorganic carrier materials, in which the carrier material is reacted with an organometallic compound before the reaction with the metallocene and, if required, further cocatalysts, are known. Such processes are described, for example, in WO 91/09882, WO 94/03506, WO 95/15815, WO 95/14044 and DE-A1-19606167. In all these processes, however, the silica gel modified with the organometallic compound is freed from the reaction solution—generally by filtration—before the reaction with the further catalyst components is carried out. However, this procedure is inconvenient, requires additional apparatus and therefore adversely affects the cost-efficiency of the process.

It is an object of the present invention to provide a process for the preparation of supported catalyst systems which does not have these disadvantages and leads in a simpler manner to a supported catalyst system of comparable productivity and quality.

BRIEF SUMMARY OF THE INVENTION

BRIEF DESCRIPTION OF THE SEVERAL VIEWS OF THE DRAWING(S)

NOT APPLICABLE

DETAILED DESCRIPTION OF THE INVENTION

NOT APPLICABLE

CLAIM OR CLAIMS (commencing on a separate sheet)

ABSTRACT OF THE DISCLOSURE (commencing on a separate sheet)

SEQUENCE LISTING (See MPEP §2424 and 37 CFR 1.821–1.8725. A nucleotide or amino acid sequence as defined in 37 CFR 1.821(a) and if the required "Sequence Listing" is not submitted as an electronic document on compact disc).

NOT APPLICABLE

NOT APPLICABLE

DETAILED DESCRIPTION OF THE INVENTION

We have found that this object is achieved by a process for the preparation of a supported catalyst system, an inorganic carrier material being reacted with a metal compound described above and of the formula I in the presence of an inert solvent in a first step and, in a subsequent step, the suspension thus obtained being reacted with a metallocene complex and a compound forming metallocenium, in which process the solvent is not removed after the first step and the subsequent step is carried out without isolation of the pretreated carrier material thus obtained.

Preferably used carrier materials are inorganic solids whose particle diameters are from 1 to 200 μm, in particular from 30 to 70 μm.

Suitable carrier materials are preferably silica gels, particularly preferably those of the formula $SiO_2 \cdot aAl_2O_3$, where a is from 0 to 2, preferably from 0 to 0.5; these are therefore aluminosilicates or silica. Such products are commercially available, e.g. Silica Gel 332 from Grace or ES70X from Cosfield.

To remove the adsorbed water, these carrier materials may be subjected to thermal treatment or may also be calcined, a treatment at 80–200° C., preferably 100–150° C., preferably being carried out.

Other inorganic compounds, such as $Al_2O_3$ or $MgCl_2$, or mixtures containing these compounds may also be used as carrier materials.

Preferred metal compounds of the formula I are those in which $M^1$ is a metal of main group III of the Periodic Table, in particular aluminum, $R^1$ is $C_1$- to $C_{10}$-alkyl and $R^2$ to $R^4$ are each $C_1$- to $C_{10}$-alkyl. For the particularly preferred case where $M^1$ is aluminum, u is zero. $R^1$ to $R^3$ advantageously have the same meaning and are each preferably methyl, ethyl, isobutyl or hexyl, especially isobutyl.

The metal compound of the formula I is preferably added in the form of a solution to a suspension of the carrier. Particularly suitable solvents or suspending agents are hydrocarbons, such as toluene or heptane. Solvents in which the metallocene complex is readily soluble are particularly preferred. The amount of metal compound I may vary within wide limits and the minimum amount depends on the number of hydroxyl groups of the carrier. Even without isolation of the pretreated carrier material after this first process step, small variations in the ratio of carrier to compound I lead only to slight differences in the performance of the catalyst system. Depending on the type of the carrier material, however, this ratio should be optimized by preliminary experiments. The temperatures, reaction times and pressures are not critical per se, temperatures of –20 to 100° C. and reaction times of from 0.1 to 48 hours being preferred.

The suspension thus obtained is then reacted in a subsequent step with a metallocene complex and a compound forming metallocenium ions, without isolation and removal of the solvent.

Examples of suitable metallocene complexes are the following compounds of the formula III:

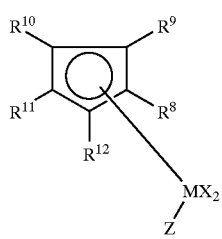

III where:

M is titanium, zirconium, hafnium, vanadium, niobium or tantalum,

X is fluorine, chlorine, bromine, iodine, hydrogen or $C_1$- to $C_{10}$-alkyl, $R^8$ to $R^{12}$ are each hydrogen, $C_1$- to $C_{10}$-alkyl, 5- to 7-membered cycloalkyl, which in turn may carry $C_1$- to $C_{10}$-alkyl as a substituent, $C_6$- to $C_{15}$-aryl or arylalkyl, it also being possible for two neighboring radicals together to be a cyclic group of 4 to 15 carbon atoms, or $Si(R^{13})_3$, $R^{13}$ is $C_1$- to $C_{10}$-alkyl, $C_3$- to $C_{10}$-cycloalkyl or $C_6$- to $C_{15}$-aryl, Z is X or 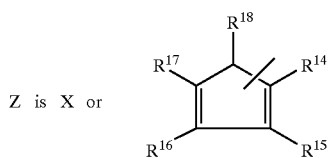, $R^{14}$ to $R^{18}$ are each hydrogen, $C_1$- to $C_{10}$-alkyl, 5- to 7-membered cycloalkyl, which in turn may carry $C_1$- to $C_{10}$-alkyl as a substituent, $C_6$- to $C_{15}$-aryl or arylalkyl, it also being possible for two neighboring radicals together to be a cyclic group of 4 to 15 carbon atoms, or $Si(R^{19})_3$, $R^{19}$ is $C_1$- to $C_{10}$-alkyl, $C_6$- to $C_{15}$-aryl or $C_3$- to $C_{10}$-cycloalkyl, or $R^{11}$ and Z together form a group $-R^{20}-A-$,

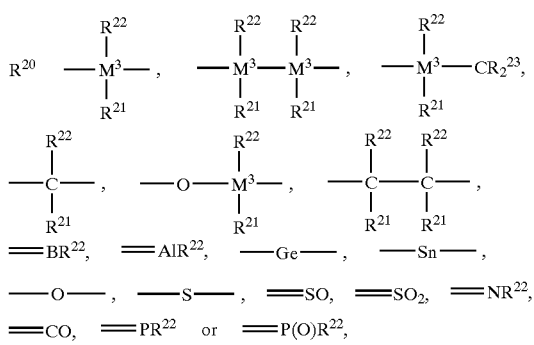

$R^{21}$, $R^{22}$ and $R^{23}$
are identical or different and are each hydrogen, halogen, $C_1-C_{10}$alkyl, $C_1-C_{10}$fluoroalkyl, $C_6-C_{10}$-fluoroaryl, $C_6-C_{10}$-aryl, $C_1-C_{10}$alkoxy, $C_2-C_{10}$-alkenyl, $C_7-C_{40}$-arylalkyl, $C_8-C_{40}$-arylalkenyl or $C_7-C_{40}$-alkylaryl, or two neighboring radicals, together with the atoms linking them, form a ring, $M^3$ is silicon, germanium or tin, A is $-O-$, $-S-$, $>NR^{24}$ or $>PR^{24}$, $R^{24}$ is $C_1$- to $C_{10}$-alkyl, $C_6$- to $C_{15}$-aryl, $C_3$- to $C_{10}$-cycloalkyl, alkylaryl or $Si(R^{25})_3$, and $R^{25}$ is hydrogen, $C_1$- to $C_{10}$-alkyl, $C_6$- to $C_{15}$-aryl, which in turn may be substituted by $C_1$- to $C_4$-alkyl, or $C_3$- to $C_{10}$-cycloalkyl or $R^{11}$ and $R^{17}$ together form a group $-R^{20}-$.

Among the metallocene complexes of the formula III,

IIIa,

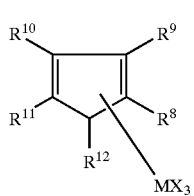

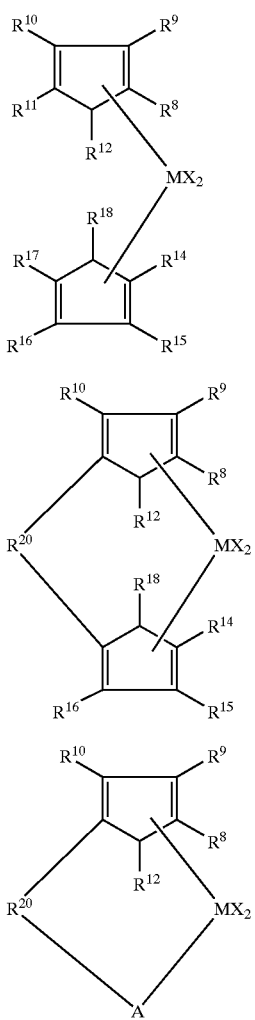

are preferred.

The radicals X may be identical or different but are preferably identical.

Particularly preferred compounds of the formula IIIa are those in which

M is titanium, zirconium or hafnium,

X is halogen, in particular chlorine, and $R^8$ to $R^{12}$ are each hydrogen or $C_1$- to $C_4$-alkyl.

Preferred compounds of the formula IIIb are those in which

M is titanium, zirconium or hafnium,

X is halogen, in particular chlorine, $R^8$ to $R^{12}$ are each hydrogen, $C_1$- to $C_4$-alkyl or $Si(R^{13})_3$, $R^{14}$ to $R^{18}$ are each hydrogen, $C_1$- to $C_4$-alkyl or $Si(R^{19})_3$.

Particularly suitable compounds of the formula IIIb are those in which the cyclopentadienyl radicals are identical.

Examples of particularly suitable compounds include:

bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride,
bis(trimethylsilylcyclopentadienyl)zirconium dichloride,
bis(indenyl)zirconium dichloride,
bis(tetrahydroindenyl)zirconium dichloride,
bis(benzindenyl)zirconium dichloride, and
bis(2-methylbenzindenyl)zirconium dichloride.

Particularly suitable compounds of the formula IIIc are those in which $R^8$ and $R^{14}$ are identical and are each hydrogen or $C_1$- to $C_{10}$-alkyl, $R^{12}$ and $R^{18}$ are identical and are each hydrogen, methyl, ethyl, isopropyl or tert-butyl, $R^{10}$ and $R^{16}$ are each $C_1$- to $C_4$-alkyl, $R^9$ and $R^{15}$ are each hydrogen or two neighboring radicals $R^9$ and $R^{10}$ on the one hand and $R^{15}$ and $R^{16}$ on the other hand together form cyclic groups of 4 to 12 carbon atoms,

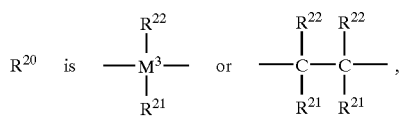

M is titanium, zirconium or hafnium and

X is halogen, in particular chlorine.

Examples of particularly suitable complex compounds include dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-methylindenyl)zirconium dichloride,
dimethylsilanediylbis(2-methylbenzindenyl)zirconium dichloride
and dimethylsilanediylbis(2-methylindenyl)-hafnium dichloride.

Particularly suitable compounds of the formula IIId are those in which

M is titanium or zirconium,

X is halogen, in particular chlorine,

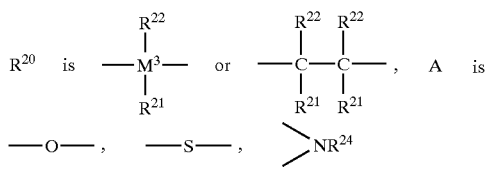

and

R$^8$ to R$^{10}$ and R$^{12}$ are each hydrogen, C$_1$- to C$_{10}$-alkyl, C$_3$- to C$_{10}$-cycloalkyl, C$_6$- to C$_{15}$-aryl or Si(R$^{14}$)$_3$, or two neighboring radicals form a cyclic group of 4 to 12 carbon atoms.

A novel process in which a zirconium complex is used as the metallocene complex is particularly preferred. Furthermore, metallocene compounds in their metallocene dihalide form are preferred.

The synthesis of such complex compounds can be carried out by methods known per se, the reaction of the correspondingly substituted, cyclic hydrocarbon anions with halides of titanium, zirconium, hafnium, vanadium, niobium or tantalum being preferred.

Examples of corresponding preparation processes are described, inter alia, in Journal of Organometallic Chemistry, 369 (1989), 359–370.

Mixtures of different metallocene complexes may also be used.

Suitable compounds forming metallocenium ions are in particular complex compounds selected from the group consisting of the strong neutral Lewis acids, the ionic compounds having Lewis acid cations and the ionic compounds having Brönsted acids as cations.

Preferred strong, neutral Lewis acids are compounds of the formula IV $$M^4X^1X^2X^3 \quad\quad\quad IV$$

where

M$^4$ is an element of main group III of the Periodic Table, in particular B, Al or Ga, preferably B, X$^1$, X$^2$ and X$^3$
are each hydrogen, C$_1$- to C$_{10}$-alkyl, C$_6$- to C$_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryls, preferably pentafluorophenyl.

Particularly preferred are compounds of the formula IV, where X$^1$, X$^2$ and X$^3$ are identical, preferably tris(pentafluorophenyl)borane.

Suitable ionic compounds having Lewis acid cations are compounds of the formula V $$[(Y^{a+})Q_1Q_2 \ldots Q_z]^{d+} \quad\quad\quad V$$

where

Y is an element of main group I to VI or subgroup I to VIII of the Periodic Table, Q$_1$ to Q$_z$ are each a radical having a single negative charge, such as C$_1$- to C$_{28}$-alkyl, C$_6$- to C$_{15}$-aryl, alkylaryl, arylalkyl, haloalkyl, haloaryl each having 6 to 20 carbon atoms in the aryl radical and 1 to 28 carbon atoms in the alkyl radical, C$_1$- to C$_{10}$-cycloalkyl, which may be substituted by C$_1$- to C$_{10}$-alkyl, or halogen, C$_1$- to C$_{28}$-alkoxy, C$_6$- to C$_{15}$-aryloxy, silyl or mercaptyl, a is an integer from 1 to 6, z is an integer from 0 to 5 and d corresponds to the difference a–z, but d is greater than or equal to 1.

Particularly suitable are carbonium cations, oxonium cations and sulfonium cations as well as cationic transition metal complexes. Particular examples are the triphenylmethyl cation, the silver cation and the 1,1'-dimethylferrocenyl cation. They preferably have noncoordinating opposite ions, in particular boron compounds, as also mentioned in WO 91/09882, preferably tetrakis(pentafluorophenyl)borate.

Examples of preferred compounds forming metallocenium ions are aryl-boron compounds substituted on the aromatic rings.

Ionic compounds having Brönsted acids as cations and preferably also non-coordinating opposite ions are mentioned in WO 91/09882, a preferred cation being N,N-dimethylanilinium.

The amount of compounds forming metallocenium ions is preferably from 0.1 to 10 equivalents, based on the metallocene complex III.

The metallocene complex and the compound forming metallocenium ions are then reacted with the suspension of the pretreated carrier material prepared as above. Preferably, the metallocene complex and the compound forming metallocenium ions are added to the suspension. An amount from 0.01 to 10% by weight, based on the inorganic carrier material, of metallocene complex is particularly suitable. The conditions for this reaction are likewise not critical, temperatures of from 20 to 100° C. and reaction times of from 0.1 to 20 hours having proven particularly suitable.

The material thus obtained can then be isolated, for example by removal of the solvent under reduced pressure.

If the metallocene complex used was a metallocene compound which, in addition to the substituted or unsubstituted cyclopentadienyl ligands, also carries halogen atoms as ligands of the metal atom, the catalyst system is present after this process step as a rule in the form which is still not fully active.

Particularly when the metallocene complex used is a metallocene compound in its metallocene dihalide form, the reaction with this metallocene compound and with the compound forming metallocenium ions is followed in a subsequent step by a reaction with a metal compound of the formula II $$M^2(R^5)_o(R^6)_p(R^7)_q \quad\quad\quad II$$

where,

M$^2$ is an alkali metal, an alkaline earth metal, zinc or a metal of main group III of the Periodic Table, i.e. boron, aluminum, gallium, indium or thallium, R$^5$ is hydrogen, C$_1$- to C$_{10}$-alkyl, C$_6$- to C$_{15}$-aryl, alkylaryl or arylalkyl each having 1 to 10 carbon atoms in the alkyl radical and 6 to 20 carbon atoms in the aryl radical, R$^6$ and R$^7$ are each hydrogen, halogen, C$_1$- to C$_{10}$-alkyl, C$_6$- to C$_{15}$-aryl, alkylaryl, arylalkyl, aryloxy or alkoxy, each having 1 to 10 carbon atoms in the alkyl radical and 6 to 20 carbon atoms in the aryl radical, o is an integer from 1 to 3 and p and q are each an integer from 0 to 2, the sum o+p+q corresponding to the valency of M$^2$.

Preferred compounds are those in which
M² is lithium, magnesium or aluminum and
R⁵ to R⁷ are each $C_1$- to $C_{10}$-alkyl.

Particularly preferred metal compounds of the formula II are n-butyllithium, n-butyl-n-octylmagnesium, n-butyl-n-heptylmagnesium and in particular aluminum alkyls, such as tri-n-hexylaluminum.

The activation step with the compound of the formula II can be carried out at any desired time, i.e. before or after the metering of the supported catalyst system into the polymerization reactor. The activation is preferably carried out in the reactor itself.

The conditions of the reaction with the compound II are not critical. Temperatures, reaction times and pressures depend on the time when the reaction, i.e. activation, is carried out.

With the aid of the supported catalyst systems prepared according to the invention, it is possible to prepare polyolefins, in particular polymers of alk-1-enes. These are understood as meaning homo- and copolymers of $C_2$- to $C_{10}$-alk-1-enes, the monomers used preferably being ethylene, propylene, but-1-ene, pent-1-ene and hex-1-ene.

However, cycloolefins or higher alk-1-enes and alkenes generally may also be used as monomers for the homo- or copolymerization.

The supported catalyst systems prepared according to the invention are distinguished in particular by high activity and they can be activated at any desired time, can be stored for a long time, are not pyrophoric and are thus easy to handle.

EXAMPLES

Preparation of the Catalysts:

50 ml of a triisobutylaluminum (Tibal) solution (concentration of the solutions: cf. Table 1) in toluene were initially taken in a 250 ml flask flushed with nitrogen. 10 g of silica gel (ES 70X, producer: Crosfield, dried at 150° C. for 7 hours under reduced pressure) were added while stirring. During this procedure, the temperature of the solution did not exceed 40° C. The reaction mixture was then heated to 80° C. for 30 minutes. 400 mg (0.5 mmol) of dimethylanilinium tetrakispentafluorophenylborate and 200 mg (0.5 mmol) of bis-n-butylcyclopentadienylzirconium dichloride were then added while stirring. Stirring was continued for 1 hour at 80° C. and then, after cooling, the solvent was removed under reduced pressure. The catalyst was obtained as a readily flowable powder.

Ethylene/Hexene Copolymerizations:

450 ml of isobutane, 40 ml of hexene and 80 mg of triethylaluminum (as a solution in heptane) were initially taken in a stirred 1 l steel autoclave after careful flushing with nitrogen and heating to the polymerization temperature of 70° C. Thereafter, about 50 mg of the supported catalyst were flushed in with a further 50 ml of isobutane and ethylene was forced in to a total pressure of 38 bar. The pressure in the autoclave was kept constant by metering further ethylene. After 90 minutes, the polymerization was stopped by letting down the autoclave. The polymer was obtained in the form of readily flowable granules. Table 1 provides further information.

Table 1 below shows the properties of catalysts prepared using different ratios of triisobutylaluminum (Tibal) as compound I to carrier material ($SiO_2$). The productivity and viscosity of the polymer, measured according to ISO 1628-3, served as test parameters. It was found that the variation in the amount of Tibal has no significant effect on the viscosity and thus the molecular weight of the polymer product. The ratio of Tibal to carrier should be kept within reasonable limits merely to achieve optimum productivity. Catalysts having very good productivity can be obtained in a wide range of ratios.

TABLE 1

Polymerizations using the novel catalysts

| Ex. | Concentration of Tibal solution [mol/l] | mmol of Tibal/ g of $SiO_2$ | Loading of the catalyst with metallocene complex [µmol/g] | Productivity [g of PE/ g of catalyst] | Viscosity of the polymer [dl/g] |
|---|---|---|---|---|---|
| 1 | 0.15 | 0.75 | 41.3 | 3300 | 2.49 |
| 2 | 0.185 | 0.92 | 42.7 | 5000 | 2.28 |
| 3 | 0.20 | 1.00 | 43.8 | 6700 | 2.35 |
| 4 | 0.235 | 1.17 | 44.6 | 6300 | 2.48 |
| 5 | 0.28 | 1.40 | 45.0 | 5000 | 2.43 |

We claim:

1. A process for the preparation of a supported catalyst system, comprising, in a first step reacting a metal compound of the formula I $$M^1(R^1)_r(R^2)_s(R^3)_t(R^4)_u \qquad I$$

where
   $M^1$ is an alkali metal, an alkaline earth metal or a metal of main group III or IV of the Periodic Table,
   $R^1$ is hydrogen, $C_1$- to $C_{10}$-alkyl, $C_6$- to $C_{15}$-aryl, alkylaryl or arylalkyl, each having 1 to 10 carbon atoms in the alkyl radical and 6 to 20 carbon atoms in the aryl radical,
   $R^2$ to $R^4$ are each hydrogen, halogen, $C_1$- to $C_{10}$-alkyl, $C_6$- to $C_{15}$-aryl, alkylaryl, arylalkyl, alkoxy, aryloxy or dialkylamino, each having 1 to 10 carbon atoms in the alkyl radical and 6 to 20 carbon atoms in the aryl radical,
   r is an integer from 1 to 4
   and
   s, t and u are each an integer from 0 to 3, the sum r+s+t+u corresponding to the valency of $M^1$, with an organic or inorganic carrier material in the presence of an inert solvent and, in a subsequent step, reacting the suspension thus obtained with a metallocene complex of the formula III:

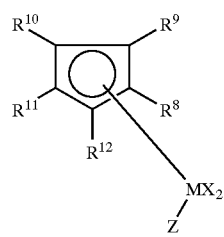

III where:
   M is titanium, zirconium, hafnium, vanadium, niobium or tantalum,
   X is fluorine, chlorine, bromine, iodine, hydrogen or $C_1$- to $C_{10}$-alkyl,
   $R^8$ to $R^{12}$ are each hydrogen, $C_1$- to $C_{10}$-alkyl, 5- to 7-membered cycloalkyl, which in turn may carry $C_1$- to $C_{10}$alkyl as a substituent, $C_6$- to $C_{15}$-aryl or arylalkyl, it also being possible for two neighboring radicals together to be a cyclic group of 4 to 15 carbon atoms, or Si(R$^{13}$)$_3$, where R$^{13}$ is C$_1$- to C$_{10}$-alkyl, C$_3$ to C$_{10}$-cycloalkyl or C$_6$- to C$_{15}$-aryl, Z is X or 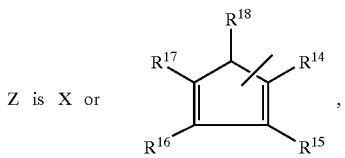, where R$^{14}$ to R$^{18}$ are each hydrogen, C$_1$- to C$_{10}$, 5- to 7-membered cycloalkyl, which in turn may carry C$_1$- to C$_{10}$-alkyl as a substituent, C$_6$- to C$_{15}$-aryl or arylalkyl, it also being possible for two neighboring radicals together to be a cyclic group of 4 to 15 carbon atoms, or Si(R$^{19}$)$_3$, where R$^{19}$ is C$_1$- to C$_{10}$-alkyl, C$_6$ to C$_{10}$-aryl or C$_3$- to C$_{10}$-cycloalkyl, or R$^{11}$ and Z together form a group —R$^{20}$—A—, where

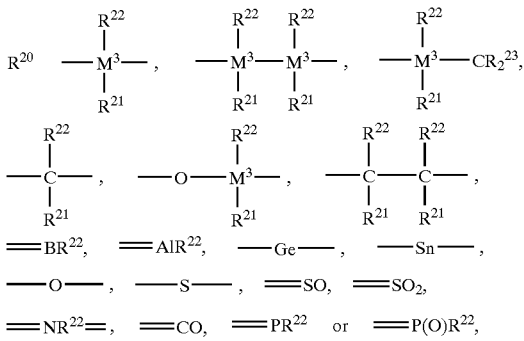

where R$^{21}$, R$^{22}$ and R$^{23}$
are identical or different and are each hydrogen, halogen, C$_1$–C$_{10}$-alkyl, C$_1$–C$_{10}$-fluoroalkyl, C$_6$–C$_{10}$-aluoroaryl, C$_6$–C$_{10}$-aryl, C$_1$–C$_{10}$-alkoxy, C$_2$–C$_{10}$-alkenyl, C$_7$–C$_{40}$-arylalkyl, C$_8$–C$_{40}$-arylalkenyl or C$_7$–C$_{40}$-alkylaryl, or two neighboring radicals, together with the atoms linking them, for a ring, M$^3$ is silicon, germanium or tin, A is 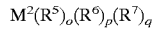, where R$^{24}$ is C$_1$- to C$_{10}$-alkyl, C$_6$- to C$_{15}$-aryl, C$_3$- to C$_{10}$-cycloalkyl, alkylaryl or Si(R$^{25}$)$_3$, and R$^{25}$ is hydrogen, C$_{1-to\,C10}$-alkyl, C$_6$- to C$_{15}$-aryl, which in turn may be substituted by C$_1$- to C$_4$-alkyl, or C$_3$- to C$_{10}$-cycloalkyl or R$^{11}$ and R$^{17}$ together form a group —R$^{20}$—, and a coordination complex compound selected from the group consisting of the neutral Lewis acids, ionic compound having Lewis acid cations and ionic compounds having Brönsted acids as cations, in which process the solvent is not removed after the first step and the subsequent step is carried out without isolation of the pretreated carrier material thus obtained.

2. A process as claimed in claim 1, wherein the inorganic carrier material used is silica gel.

3. A process as claimed in claim 1, wherein, in the formula I, M$^1$ is aluminum, R$^1$ to R$^3$ are each C$_1$- to C$_{10}$-alkyl and u is zero.

4. A process as claimed in claim 1, wherein the metallocene complex used is a zirconium complex.

5. A process as claimed in claim 1 wherein the metallocene complex used is a metallocene compound in its metallocene dihalide form.

6. A process as claimed in claim 1, wherein an aryl-boron compound substituted on the aromatic rings is used as the coordination complex compound.

7. A process as claimed in claim 1, wherein the solvent is removed after the reaction of the pretreated carrier material with the metallocene complex and the coordination complex compound.

8. A process as claimed in claim 1, wherein, if the metallocene complex used is a metallocene compound in its metallocene dihalide form, the reaction with this metallocene compound and the coordination complex compound is followed by a reaction with a metal compound of the formula II $$M^2(R^5)_o(R^6)_p(R^7)_q \qquad II$$

where

M$^2$ is an alkali metal, an alkaline earth metal, zinc or a metal of main group III of the Periodic Table, R$^5$ is hydrogen, C$_1$- to C$_{10}$-alkyl, C$_6$- to C$_{15}$-aryl, alkylaryl or arylalkyl, each having 1 to 10 carbon atoms in the alkyl radical and 6 to 20 carbon atoms in the aryl radical, R$^6$ and R$^7$ are each hydrogen, halogen, C$_1$- to C$_{10}$-alkyl, C$_6$- to C$_{15}$-aryl, alkylaryl, arylalkyl, aryloxy or alkoxy, each having 1 to 10 carbon atoms in the alkyl radical and 6 to 20 carbon atoms in the aryl radical, o is an integer from 1 to 3
and p and q are each an integer from 0 to 2, the sum o+p+q corresponding to the valency of M$^2$.

9. A process as claimed in claim 8, wherein an aluminum alkyl is used as the metal compound of the formula II.

* * * * *

UNITED STATES PATENT AND TRADEMARK OFFICE
CERTIFICATE OF CORRECTION

PATENT NO.    : 6,683,018 B1
DATED         : January 27, 2004
INVENTOR(S)   : Kristen et al.

It is certified that error appears in the above-identified patent and that said Letters Patent is hereby corrected as shown below:

Column 11,
Line 20, "$C_{10}$-aryl" should be -- $C_{15}$-aryl --;
Line 25, after "$R^{20}$" insert -- is --;
Line 53, "$C_{1\text{-to }C10}$-alkyl" should be -- $C_1$- to $C_{10}$-alkyl --.

Signed and Sealed this

Sixth Day of July, 2004

JON W. DUDAS
*Acting Director of the United States Patent and Trademark Office*